United States Patent
Martel, Jr. et al.

(10) Patent No.: US 6,584,709 B2
(45) Date of Patent: Jul. 1, 2003

(54) DEVICE FOR REMOVING SLUDGE FROM THE BOTTOM OF A LAGOON

(75) Inventors: Courtland James Martel, Jr., Enfield, NH (US); Dennis J. Lambert, Wilmot Flat, NH (US)

(73) Assignee: The United States of America as represented by the Secretary of the Army, Washington, DC (US)

( * ) Notice: Subject to any disclaimer, the term of this patent is extended or adjusted under 35 U.S.C. 154(b) by 0 days.

(21) Appl. No.: 09/875,988

(22) Filed: Jun. 8, 2001

(65) Prior Publication Data

US 2002/0184797 A1 Dec. 12, 2002

(51) Int. Cl.$^7$ .............................. E02F 3/88; B01D 21/00
(52) U.S. Cl. ......................................... 37/313; 210/170
(58) Field of Search ........................... 37/307, 313, 317, 37/318, 320, 326, 333, 335; 210/86, 97, 170, 173, 241, 242.1, 803, 805

(56) References Cited

U.S. PATENT DOCUMENTS

| 4,160,632 A | | 7/1979 | Scriminger et al. |
| 4,217,212 A | * | 8/1980 | Deal .......................... 210/600 |
| 4,536,286 A | | 8/1985 | Nugent |
| 4,642,919 A | * | 2/1987 | Werner et al. ................ 37/313 |
| 4,677,997 A | | 7/1987 | Strauss |
| 4,750,279 A | * | 6/1988 | Hofland ........................ 37/313 |
| 4,808,305 A | * | 2/1989 | Arnold ........................ 210/170 |
| 4,957,622 A | * | 9/1990 | Mims ........................ 210/170 |
| 5,622,571 A | | 4/1997 | Derlein |
| 6,237,177 B1 | | 5/2001 | Richardson |

* cited by examiner

Primary Examiner—Robert E. Pezzuto
(74) Attorney, Agent, or Firm—Earl H. Baugher, Jr.

(57) ABSTRACT

A system removes a pre-specified amount of material from a body of water to facilitate continued operation thereof. A particular embodiment envisions a sled-like device that, assisted with floats, suitable connectors and a hand winch may be positioned anywhere in the body of water. In operation, it is pulled along the bottom of the body of water at a pre-specified rate via a cable and winch affixed to a ground-anchored cable located on shore. The device is symmetric so that it may be pulled in either direction. At each end of the device is a scoop arranged to dislodge material on the bottom and transfer it to a central pump chamber from which an onboard submersible pump transfers it via a hose to a remote repository for further disposition. The system is compact and simple, both in design and operation, facilitating use and maintenance by existing operations personnel.

14 Claims, 2 Drawing Sheets

DEVICE FOR REMOVING SLUDGE FROM THE BOTTOM OF A LAGOON

STATEMENT OF GOVERNMENT INTEREST

The invention described herein may be manufactured and used by or for the Government of the United States of America for governmental purposes without the payment of any royalties thereon or therefor.

FIELD OF THE INVENTION

A system, device and method facilitates maintenance of operations within a body of water, and more particularly provides a system, device, and method for removing a pre-specified amount of sludge from the bottom of a lagoon.

BACKGROUND

It is a common problem that sludge accumulates at the bottom of lagoons. If this accumulation is allowed to continue, the solids removal efficiency of the lagoon would be diminished and the associated plant could be in violation of its discharge permit. The present approach is to hire a dredging company to completely clean out the lagoon. These companies typically use large floating dredges that can cause a re-suspension of solids in the water column. As mentioned before, this can result in a violation of the discharge permit.

Various cleaning devices are presently available and examples are illustrated in U.S. Pat. Nos. 4,160,632, 4,536,286, 4,677,997, 5,622,571 and 6,237,177.

There is a need in the industry for a device that effectively removes the sludge from the bottom of a lagoon without adversely affecting the solids removal efficiency of the lagoon.

SUMMARY

An object of the present invention is to provide a device for removing sludge from a lagoon but it could be used in any water body where removal of sludge or sediment is needed. This includes sewage lagoons, settling basins, stabilization ponds, and recreational lakes, etc.

Another object of the present invention is to provide a device for removing sludge from a lagoon that may be used in an operating lagoon without causing a violation of a discharge permit. More particularly, the device of the present invention may be used without shutting down or taking out of service the lagoon.

Another object is to provide a sludge removal device that is simple to operate and may be operated easily by in-house personnel at their convenience.

Another object is to provide a sludge removal device that, when used as intended, does not require the lagoon to be cleaned because it maintains the amount of sludge at a steady state. In other words, the device of the present invention removes only enough sludge to maintain a steady state, instead of removing all the accumulated sludge.

Another object is to provide a sludge removal device that requires significantly less labor because it is intended to remove only a portion of the sludge on an annual basis. The amount of sludge removed is determined by the annual accumulation rate.

Yet an additional object of the present invention is to provide a sludge removal device that is significantly less expensive to own, operate and maintain.

Another object is to provide a sludge removal device that allows an operator to reverse the direction of travel without having to turn the device around.

Another object is to provide a sludge removal device that includes a tapered grill at both ends thereof to prevent large objects from clogging the device and, at the same time, allow it to slide over obstructions.

Another object is to provide a sludge removal device that includes a surface float system that allows the operator to raise and lower the device anywhere in a lagoon, that supports a 90 degree pipe transition elbow and vertically stabilizes the device during operation.

Another object is to provide a sludge removal device that includes a winch system that allows the operator to control the rate and direction of travel.

Another object is to provide a sludge removal device that includes a pump system that transports the sludge from the device, through a float supported hose, to a remote onshore repository.

In summary, a preferred embodiment of the present invention provides a sludge removal device that removes an amount of the sludge that is equal to its accumulation over a pre-specified period, such as a year, thereby creating a steady state such that a lagoon's sludge holding capacity is not exceeded. Also, since it only disturbs a small portion of the lagoon, the effluent quality is not significantly diminished. Therefore, the lagoon remains in operation while the sludge is being removed. In addition, since only a small portion of the sludge is removed, only considerably downsized equipment is needed, resulting in significantly less disturbance of the water column.

A preferred embodiment of the present invention provides a sludge removal device having an elongated frame including first and second end portions. The frame includes first and second laterally spaced runners defining a recess therebetween. A scoop is positioned in each end of the recess and the scoops each include an inclined bottom. Both the first and second end portions include an opening, over which a grill is fitted, to permit fluid communication with the sludge. A pump is operably connected to the central pump chamber of the device for pumping the sludge collected in the scoop to a remote location.

DETAILED DESCRIPTION

Figure 1:
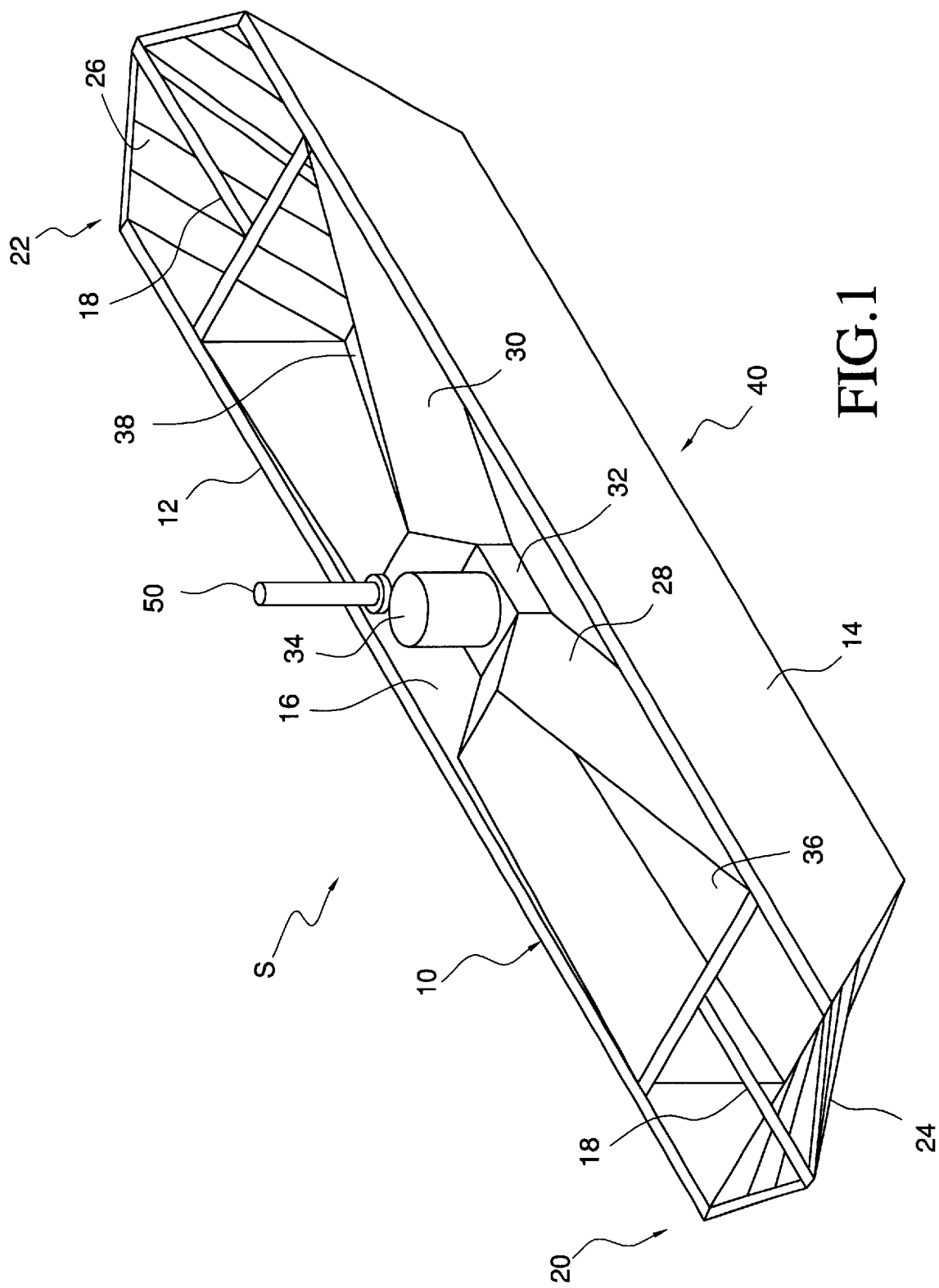
FIG. 1 is a top perspective view of a preferred embodiment of the present invention.

Refer to FIG. 1. A preferred embodiment is in the form of a sled S including a frame 10 comprising laterally spaced left and right runners 12, 14. The frame 10 preferably has sides 13, 15 of sheet metal to prevent snagging on items in the water, such as aeration pipes: Dimensions are approximately 3.5 m (12') long by 1.0 m (3') wide by 0.6 m (2') deep. These dimensions may be varied to suit the application. These dimensions provide a sled S much smaller than a regular dredge because the objective is to remove only some of the sludge SL in the lagoon.

The runners 12, 14 define a recess 16 therebetween. A third runner 18 serves as a brace. being positioned between left and right runners 12, 14 adjacent the ends 20, 22 of the sled S. Grills 24, 26 are provided at the ends 20, 22 to prevent large objects from clogging the sled S. The runners 12, 14 and the grills 24, 26 are generally curved so the sled S easily rides over any obstructions along its pathway.

Two generally identical scoops 28, 30 are positioned axially in the recess 16 and feed into a central pump chamber 32. A submersible pump 34 is connected to the pump chamber 32, for pumping sludge SL collected in the scoops 28, 30. The scoops 28, 30 have bottoms 36, 38 that incline upwardly toward the center 40 of the frame 10 such that the movement of the sled S forces the sludge SL off the bottom of the lagoon L and channels it into the center pump chamber 32. Both ends 20, 22 of the frame 10 are generally identical so that the sled may operate in either direction.

Figure 2:
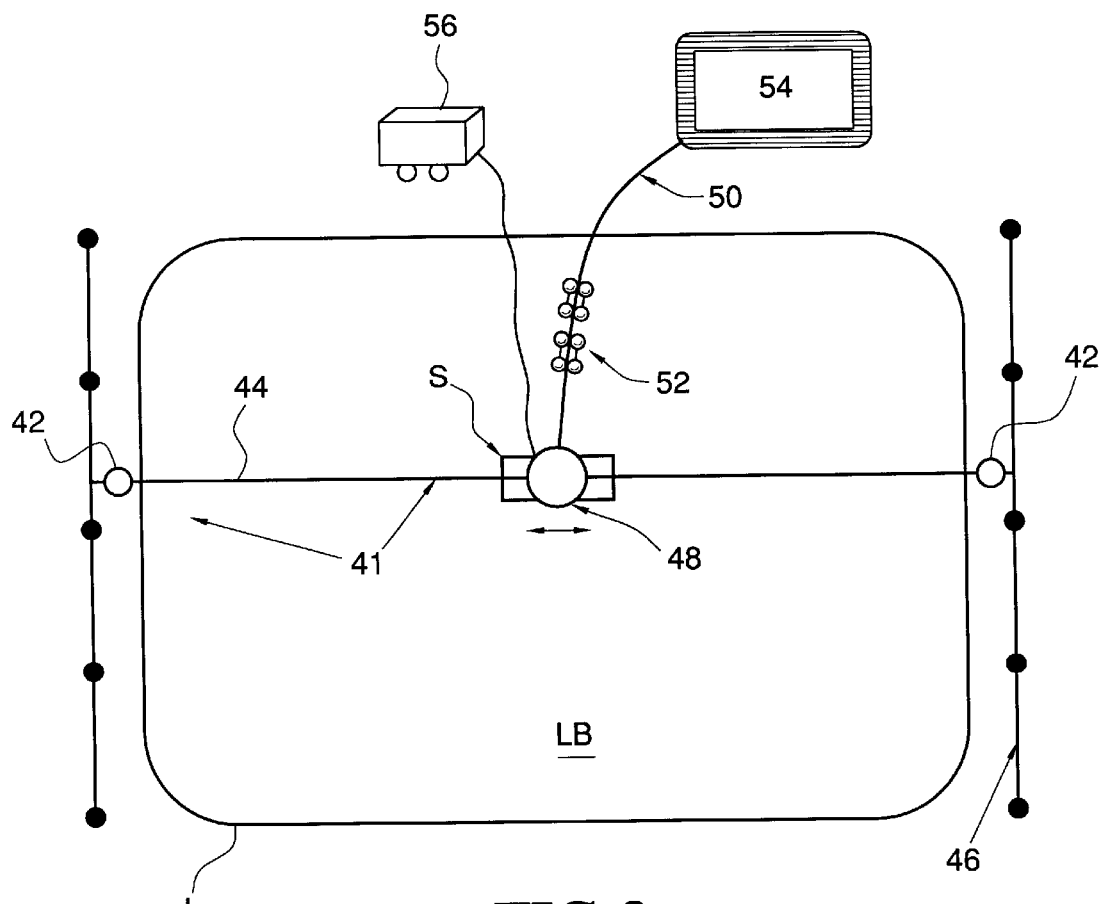
FIG. 2 is a schematic top view of the installed system of a preferred embodiment during operation.
Figure 3:
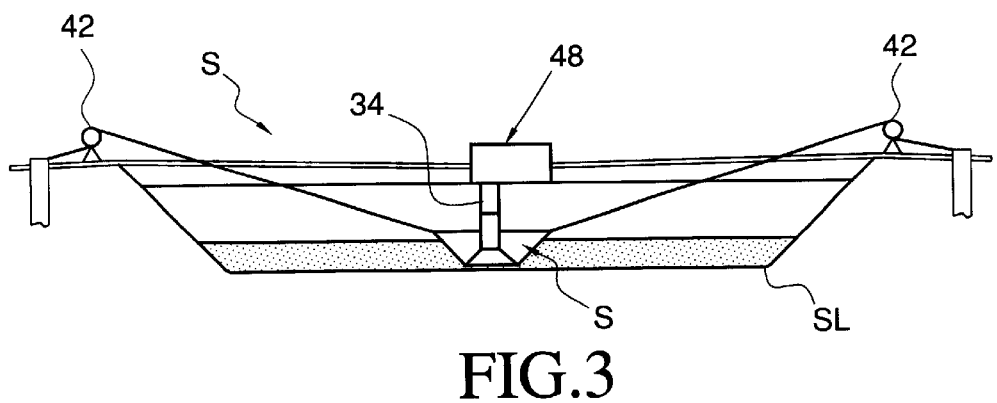
FIG. 3 is a profile of a preferred embodiment depicted with winches installed on opposing sides of a body of water.

Refer to FIGS. 2 and 3. The sled S is operated by dragging it along the lagoon bottom LB using a system 41 incorporating winches 42, cables 44, and ground-anchored cables 46. The cable 44 is wound at a rate such that sludge SL is continuously brought into the central pump chamber 32 and removed by the pump 34. In an experiment conducted with a prototype, more water than sludge SL is removed if the sled advanced too slowly. Conversely, some sludge would overtop the sled S if it advanced too rapidly. The optimal operational range is 1.5 to 3.0 m/min. This rate may vary in other applications depending on the characteristics of the sludge.

When the desired pathway has been cleared of sludge SL, the winch and cable system 41 can be repositioned to the left or right on the ground-anchored cable 46, and the direction of travel of the sled S may be reversed. After that pathway has been cleared, the winch and cable system 41 is again repositioned for a reversed direction of travel. This procedure is continued until the operator is satisfied that the required amount of sludge from the affected area has been removed.

The sludge SL scooped up by the sled S is removed by a pumping system, which includes the submersible pump 34, a float connector 48, a hose 50, and float supports 52. The pump 34 may be electrical or air-powered. The function of the pump 34 is to force the sludge SL through the hose 50 to an onshore collection/disposal site 54. The float connector 48 includes conventional components, such as a 90° elbow and hose couplings, electric line or air hose, and a hand winch to raise or lower the sludge sled S. The hose 50 would, preferably, have a smooth bore for unrestricted flow of water and is transparent, at least in some portion, to allow visual observation of flow. The hose 50 is supported by floats 52 to reduce drag force on the winch 42. A compressor 56 is connected to the pump 34.

While this invention has been described as having preferred ranges, steps, materials, or designs, it is understood that it is capable of further modifications, uses and/or adaptations of the invention following in general the principle of the invention, and including such departures from the present disclosure, as those come within the known or customary practice in the art to which the invention pertains and as may be applied to the central features hereinbefore set forth, and fall within the scope of the invention and of the appended claims.

We claim:

1. An inexpensive compact system of simplified construction and operation for maintaining the operational readiness of a body of water by removing a pre-specified amount of material while minimizing impact on the characteristics of the water in said body of water, said system capable of operation and maintenance by existing operations crews, comprising:

open structure, having a long dimension along which said structure is symmetric, a width perpendicular to said long dimension and a depth shorter than said width, incorporating scoops affixed to said structure so as to extend from each end of said long dimension to near the center of said structure, said scoops having a bottom inclined upwards towards said center of said structure and a central pump chamber affixed to said frame approximately central to said long dimension and said width and in operable communication with each said scoop, wherein each said scoop first captures said material and transfers said material to said central pump chamber by the action of being pulled across said material;

at least one pump in operable communication with said central pump chamber;

at least one hose in operable communication with said at least one pump and a remote repository;

at least one float affixed to said open structure via at least one float connector;

at least one connection for affixing to a cable for pulling said structure;

at least one winch, each said at least one winch located at opposing ends of said body of water, said at least one winch incorporating said cable in operable communication with said structure for pulling said structure in a direction parallel to said long dimension; and ground-anchored cables, at least one each of said ground-anchored cables located at each of two opposing ends of said body of water, and with which said at least one winch is in operable communication, said ground-anchored cable facilitating anchoring and positioning said at least one winches along said opposing ends of said body of water, wherein said system is used to remove said pre-specified amount of material from the bottom of said body of water by dragging said open structure along said bottom at a pre-specified velocity that directs said material into one said scoop for further transfer to said central pump chamber while operating said pump to direct said material from said central pump chamber to said remote repository via said hose, and wherein said system may be operated in a reverse direction without having to turn said open structure due to said symmetry along said long dimension.

2. The system of claim 1 in which said scoops are protected by a grill affixed proximate thereto.

3. The system of claim 1 in which said pump is a submersible pump and further comprising a remote compressor for powering said submersible pump.

4. The system of claim 1 in which said pump is a submersible pump powered by a remote source of electrical power.

5. An inexpensive compact open structure of simplified construction and operation having a long dimension along which said structure is symmetric, a width perpendicular to said long dimension and a depth shorter than said width, said structure useful for removing a pre-specified amount of material to maintain the operational readiness of a body of water while minimizing impact on the characteristics of the water in said body of water and capable of operation and maintenance by existing operations crews, comprising:

a frame having enclosed sides along said long dimension and cross members connecting said enclosed sides, wherein said cross members assist in maintaining said structure's shape during operation;

scoops affixed to said structure so as to extend from each end of said long dimension to near the center of said structure, said scoops having a bottom inclined upwards towards said center of said structure;

a central pump chamber affixed to said frame approximately central to said long dimension and said width and in operable communication with each said scoop, wherein each said scoop first captures said material and transfers said material to said central pump chamber by the action of being dragged across said material; and a grill positioned proximate each said scoop to prevent large objects from entering said scoop, wherein said structure may be operated in a reverse direction without having to turn said structure due to said symmetry along said long dimension.

6. The structure of claim 5 further comprising at least one pump in operable communication with said central pump chamber.

7. The structure of claim 5 further comprising at least one hose in operable communication with said at least one pump and a remote repository.

8. The structure of claim 5 further comprising at least one float affixed to said open structure via at least one float connector.

9. The structure of claim 5 further comprising at least one connection for affixing to a cable for pulling said structure.

10. A method of maintaining the operational readiness of a body of water while minimizing impact on the characteristics of the water in said body of water, said method capable of performance by existing operations crews, comprising:

dragging, at a pre-specified rate, along the bottom of said body of water an open structure having a long dimension along which said structure is symmetric, a width perpendicular to said long dimension, and a depth shorter than said width, said structure attached to at least one cable pulled by at least one winch affixed onshore, said structure further incorporating:

a scoop on each end of said long dimension, each said scoop having a bottom inclined upwards towards the center of said open structure;

a central pump chamber;

at least one pump in operable communication with said central pump chamber;

at least one hose in operable communication with said at least one pump and a remote repository;

at least one float affixed to said structure via at least one float connector;

at least one connection for affixing to said cable for pulling said structure;

dragging said structure across said material at said pre-specified rate to capture said material in said scoop;

transferring said material to said central pump chamber by the action of dragging said structure across said material at said pre-specified rate;

pumping said material from said central pump chamber to said remote repository via said hose, wherein said at least one winch affixed via said at least one cable to said at least one connection, each said at least one winch located at opposing ends of said body of water, drags said structure in a direction parallel to said long dimension; and wherein said at least one winch is in operable communication with at least one ground-anchored cable, each said at least one ground-anchored cable located at one of two opposing ends of said body of water for anchoring and positioning said at least one winches along said opposing ends of said body of water;

stopping said structure upon reaching one side of said body of water;

sliding said at least one winches along said at least one ground anchored cables to enable a next section of said bottom of said body of water to be dragged;

reversing the direction of dragging of said structure without having to turn said structure by using one at least one said winch on the opposite side of said body of water from the side at which said structure was stopped; and repeating said dragging, stopping, sliding, and reversing operations until said pre-specified amount of material is removed from said bottom of said body of water.

11. The method of claim 10 in which said pre-specified rate is 1.5–3.0 m/min.

12. The method of claim 10 in which each said scoop is protected by a grill.

13. The method of claim 10 in which said pump is a submersible pump further comprising a remote compressor for powering said submersible pump.

14. The method of claim 10 in which said pump is a submersible pump powered by a remote source of electrical power.

* * * * *